US012706810B2

(12) United States Patent
Mantha et al.

(10) Patent No.: US 12,706,810 B2
(45) Date of Patent: Aug. 11, 2026

(54) METHODS FOR INTELLIGENT SIGNALING MESSAGE STEERING IN 5G CORE

(71) Applicant: F5, Inc., Seattle, WA (US)

(72) Inventors: Ravi Sankar Mantha, Bangalore (IN); Sandeep Dasgupta, Bangalore (IN)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/799,644

(22) Filed: Aug. 9, 2024

(65) Prior Publication Data

US 2025/0300893 A1 Sep. 25, 2025

Related U.S. Application Data

(60) Provisional application No. 63/531,663, filed on Aug. 9, 2023.

(51) Int. Cl.
*H04L 41/12* (2022.01)
*H04L 41/16* (2022.01)
*H04L 45/74* (2022.01)

(52) U.S. Cl.
CPC .............. *H04L 41/12* (2013.01); *H04L 41/16* (2013.01); *H04L 45/74* (2013.01)

(58) Field of Classification Search
None
See application file for complete search history.

(56) References Cited

U.S. PATENT DOCUMENTS 1,302,020 A 4/1919 Dittbrenner
1,570,239 A 1/1926 Gilman
3,255,845 A 6/1966 Gardner
8,112,471 B2 2/2012 Wei
8,458,353 B2 6/2013 Krishnaswamy
9,172,756 B2 10/2015 Ramachandran
9,450,880 B2 9/2016 Janakiraman
(Continued)

FOREIGN PATENT DOCUMENTS

EP 3255845 A1 12/2017
WO 2017144123 A1 8/2017
WO 20230117367 A1 6/2023

OTHER PUBLICATIONS

European Search Report for EP Application No. 24193940.4, dated Oct. 30, 2024.

(Continued)

*Primary Examiner* — Thomas J Dailey
(74) *Attorney, Agent, or Firm* — Troutman Pepper Locke LLP

(57) ABSTRACT

Methods, non-transitory computer readable media, network traffic management devices and network traffic management systems that provide for intelligent signaling message steering in 5G core are illustrated. With this technology, a network request is received and a set of features are identified. Based on the set of identified features and a failure probability table, a faulty producer network function (NFs) of a plurality of producer NFs can be identified. A subset of the plurality of NFs that does not include the faulty NF can be defined and the network request can be routed to one of the subset of the plurality of NFs. Accordingly, a network request can be routed away from a NF that, based on the features of the network request, has a relative high probability of resulting in a failure of processing the network request.

20 Claims, 10 Drawing Sheets

(56) References Cited

U.S. PATENT DOCUMENTS

| | | | | |
|---|---|---|---|---|
| 9,674,054 | B2 | 6/2017 | Scharf | |
| 10,143,001 | B2 | 11/2018 | Schliwa-Bertling | |
| 10,757,146 | B2 | 8/2020 | Annamalaisami | |
| 11,783,087 | B1 | 10/2023 | Agarwal | |
| 12,192,820 | B2 * | 1/2025 | Yeh | G06N 3/045 |
| 12,289,209 | B1 * | 4/2025 | Evans | H04L 41/145 |
| 2002/0143892 | A1 | 10/2002 | Mogul | |
| 2007/0071233 | A1 | 3/2007 | Zak | |
| 2007/0147258 | A1 | 6/2007 | Mottishaw | |
| 2007/0206620 | A1 | 9/2007 | Cortes | |
| 2009/0180477 | A1 | 7/2009 | Akahane | |
| 2010/0290468 | A1 | 11/2010 | Lynam | |
| 2014/0040451 | A1 | 2/2014 | Agrawal | |
| 2015/0230274 | A1 | 8/2015 | Sharma | |
| 2016/0140045 | A1 | 5/2016 | Bergeron | |
| 2016/0142438 | A1 | 5/2016 | Pastore | |
| 2017/0144123 | A1 | 5/2017 | Tabeling | |
| 2017/0195427 | A1 | 7/2017 | Choquette | |
| 2017/0317920 | A1 | 11/2017 | Rocquelay | |
| 2017/0373953 | A1 | 12/2017 | George | |
| 2018/0041524 | A1 | 2/2018 | Reddy | |
| 2018/0062979 | A1 | 3/2018 | Zee | |
| 2018/0189471 | A1 | 7/2018 | Paluri | |
| 2018/0248714 | A1 | 8/2018 | Milescu | |
| 2019/0068694 | A1 | 2/2019 | Ripke | |
| 2019/0182363 | A1 | 6/2019 | Bonaventure | |
| 2019/0182367 | A1 | 6/2019 | Kim | |
| 2019/0297058 | A1 | 9/2019 | Ragusa | |
| 2019/0372937 | A1 | 12/2019 | Song | |
| 2020/0177592 | A1 | 6/2020 | Idika | |
| 2020/0314615 | A1 | 10/2020 | Patil | |
| 2020/0396267 | A1 | 12/2020 | Petria | |
| 2021/0022041 | A1 | 1/2021 | Allan | |
| 2021/0204200 | A1 | 7/2021 | Krishan | |
| 2022/0060547 | A1 | 2/2022 | Krishan | |
| 2022/0070648 | A1 | 3/2022 | Krishan | |
| 2022/0200851 | A1 | 6/2022 | Smith | |
| 2023/0110131 | A1 | 4/2023 | Smith | |
| 2024/0015569 | A1 * | 1/2024 | Doostnejad | H04L 47/24 |
| 2024/0114012 | A1 | 4/2024 | Venkatesan | |

OTHER PUBLICATIONS

European Search Report Dated Feb. 27, 2025. European Application No. EP 24 20 2428.9.

European Search Report dated Sep. 18, 2024. European Application No. 24173105.8.

F5 Networks, Release Notes: BIG-IP 11.5.0 L TM and TMOS Release Notes, available at: https://techdocs.f5.com/kb/n-us/products/big-ip_ltm/releasenotes/producl/relnoteltm-11-5-0.html#rn_new, Mar. 18, 2018.

Ford et al., Request for Comments: 6824, TCP Extensions for Multipath Operation with Multiple Addresses, available at: https://tools.ielf.org/pdf/rfc6824. pdf, Jan. 2013.

Scharf et al., Request for Comments: 6897, Multipath TCP (MPTCP) Application Interface Considerations, available at: https://www.rfc-editor.org/rfc/pdfrfc/rfc6897. lxt. pdf, Mar. 2013.

F5—Simplify and Secure 5G Core Signaling https ://www. f5. co mi prod u cts/big-i p-se 1vlces/se rvice-co mmu n Ication-proxy downloaded Sep. 27, 2023.

F5—Secure 5G Roaming and Network Interconnection https ://www. f5.com/ prod u cts/big-i p-se 1vices/secu rity-edge-protectio n-proxy downloaded Sep. 27, 2023.

Oracle Communications—Cloud Native Core; Licensing Information user Manual; Release 2.0.0; F22873-0 (Sep. 2019) https://docs. oracle .com/cd/F22976. _ 01 /docs. 1 O /L.icensin~i%20Manual .pdf downloaded Sep. 29, 2023.

Cisco—Ultra Cloud Core 5G Session Management Function, Release 2021 .01—Configuration and Administration Guide—Wreless Priority Guide https :l /www.cisco.com/c/en/us/td/docs/wi reiesstucc/smf/2021-01-0/SMF Config_Admi n/b ucc-5g-smf-config-and-admin-guide. _ 2021-01 im _ wireless-priority-services. html Updated Feb. 12, 2021; downloaded Sep. 27, 2023.

M. Tllomson, et al.; internet Engineering Task Force (IETF); RFC 91 •13-HTTP/2, section 5.3 https://datatracker.ietlorg/docihtml/rfc9113#section-5.3 Published Jun. 2022 (ISSN: 2070-1721) downloaded Sep. 27, 2023.

Extended European Search Report, dated Mar. 25, 2022.

ETSI TS 128 500 V17.8.0 (Oct. 2022) Technical Specification; 5G System; Tec:tmical Realization of Sew1vice Based 10 Architecture: Stage 3 (3GPP TS29.500 version 17.8.0 Release 17) https :l /portal .etsi .orgtweba pp/workprog rn mlReport_W orkitem. asp\I\INK I_I 0=67084 downloaded Sep. 29, 2023.

Tripathi et al., "Protected resource access for mobile agent-based distributed computing," Proceedings of the 1998 ICPP Workshop on Architectural and OS Support for Multimedia Applications Flexible Communication Systems. Wireless Networks and Mobile Computing (Cat. No. 98EX206) Year: 1998 I Conference Paper I Publ.

Inagaki et al., "Shared-Resource Management Using Online Social-Relationship Metric for Altruistic Device Sharing," IEEE Access Year: 2018 I vol. 6 I Journal Article I Publisher: IEEE.

* cited by examiner

| | Feature | Description | Values | Comments |
|---|---|---|---|---|
| 1 | unauthenticatedSupi | Unauthenticated SUPI for emergency services | True/false | |
| 2 | pduSessionId | PDU session ID | Integer | |
| 3 | dnn | Data Network Name | String | Internet, ims etc |
| 4 | sNssai | Requested nNssai for the serving PLMN | Integer | |
| 5 | servingNFId | | | Ex: servingAMF |
| 6 | servingNetwork | PLMN ID for serving core or SNPN | | |
| 7 | anType | Access Network Type | | |
| 8 | PresenceLADN | Inside/Outside LADN area | IN, OUT | |
| 9 | ueLocation | | TAI | |
| 10 | ueTimeZone | | | |
| 11 | oldPduSessionId | | | |
| 12 | pcfId | PCF selected by AMF | | |
| 13 | pcfGroupId | | | |
| 14 | pcfSetId | | | |
| 15 | supportedFeatures | | | |
| 16 | selMode | DNN Selection Mode | | |
| 17 | udmGroupId | Identity of the UDM group serving the UE. | | |
| 18 | epsInterworkingInd | EpsInterworkingIndication | | |
| 19 | indirectForwardingFlag | | True/false | |
| 20 | directForwardingFlag | | True/false | |
| 21 | Sbi-message-priority | 0..64 | | |
| 22 | N1-PDU-Session-Type | Ipv4, ipv6, ipv4v6, ethernet, unstructured | | |
| 23 | N1-SSC-Mode | Mode1, 2 and 3 | | |
| 24 | N1-Always-on | | True/false | |

FIG. 4

Sample training set (maintained per SMF)

| AMF IP | DNN | QCI | ARP | Location | RAT-Type | Response |
|---|---|---|---|---|---|---|
| IP1 | IMS | 5 | 1 | TAI1 | WLAN | Success |
| IP2 | Data | 6 | 1 | TAI2 | 5G | Failure |
| IP1 | IMS | 5 | 2 | TAI2 | WLAN | Success |
| IP2 | Data | 5 | 2 | TAI1 | 5G | Failure |
| IP2 | Data | 5 | 2 | TAI2 | 5G | Success |

FIG. 5

Feature DNN=internet, Create failure probability table

| | 10:00AM 30/11/2022 | 11:00AM 30/11/2022 | 12:00PM 30/11/2022 |
|---|---|---|---|
| SMF1 | 2% | 1.8% | **5%** |
| SMF2 | 1.7% | 1.9% | 1.6% |
| SMF3 | 2% | 1.9% | 2.3% |

FIG. 6A

Feature session type=ipv6, Create failure probability table

| | 10:00AM 30/11/2022 | 11:00AM 30/11/2022 | 12:00PM 30/11/2022 |
|---|---|---|---|
| SMF1 | 0.5% | 1.9% | **4.5%** |
| SMF2 | 1.2% | 1.4% | 0.2% |
| SMF3 | 1.8% | 1.9% | 2.3% |

FIG. 6B

| DNN=internet | Sesstype=ipv6 | ~ SMF1 | Status = ACTIVE |
|---|---|---|---|

FIG. 6C

METHODS FOR INTELLIGENT SIGNALING MESSAGE STEERING IN 5G CORE

CROSS-REFERENCE TO RELATED APPLICATION(S)

This application claims priority to U.S. Provisional Application No. 63/531,663, filed on Aug. 9, 2023, which is hereby incorporated herein by reference in its entirety.

FIELD

This technology relates to methods and systems for intelligently routing network requests within a 5G core network.

BACKGROUND 5G is a global wireless standard representing the fifth generation of cellular network technology. In contrast to 4G technology, 5G introduces the use of high band (i.e., millimeter wave) frequencies that, while more limited in range than their low and mid-band frequency counterparts, can offer much faster data transfer speeds, thereby enabling new levels of service and new technological applications. Another advantage of 5G is that it provides for network function virtualization (NFV), which decouples network functions from proprietary hardware so that network functions can run as software on standardized hardware, which makes the network more flexible by minimizing dependence on specific hardware.

Like previous mobile network generations, the 5G core network provides access to services for devices while providing service providers the functions they need to authenticate, authorize and manage their customers. However, the architecture of the 5G core network provides extended capabilities that provide advantages over previous generations. Software-defined and built with a service-based architecture (SBA), this architecture allows the 5G core to be disaggregated, cloud-native and distributed. One of the many advantages of a 5G core is that the location of network functions (NFs) can be optimally placed to ensure the greatest efficiency, highest performance and lowest latency.

Conventionally, mobile networks deploy multiple NFs and support load balancing to achieve high availability. Such configurations support dynamic parameters such as load and service availability, as well as static parameters such as location. In an ideal world, all such NFs would be similar and operate identically (e.g., every AMF would operate the same), however in practice NFs commonly differ from one another due to various factors such as configuration mismatch/errors, specific network connectivity issues, different images/versions (e.g., one AMF has received a software update and another has not yet received the update) and specific exposure to software/hardware defects. Conventionally, incoming network requests are load balanced based on generic parameters such as load, capacity, location and the like. However, due to the reality that all NFs are not identical in practice, such conventional load balancing approaches will not yield efficient traffic routing and will not maximize the success rate of the services offered by various NFs.

Therefore, it is desirable to create a system for more efficient selection of destination NFs in a 5G core network that can account for differences in operation of similar NF types, even accounting for the fact that such differences may be dynamic and evolving.

SUMMARY

A method implemented by a network traffic management system that includes receiving a network request. A set of features is identified based on the network request. A faulty producer network function (NF) is identified from a plurality of producer NFs based on the set of features and a failure probability table. A subset of the plurality of producer NFs is defined that does not include the faulty one of the producer NFs. The network request is routed to one of the subset of the plurality of producer NFs.

A network traffic management device includes a memory including programmed instructions stored thereon and one or more processors configured to be capable of executing the stored programmed instructions to receive a network request. A set of features is identified based on the network request. A faulty producer network function (NF) is identified from a plurality of producer NFs based on the set of features and a failure probability table. A subset of the plurality of producer NFs is defined that does not include the faulty one of the producer NFs. The network request is routed to one of the subset of the plurality of producer NFs.

A non-transitory computer readable medium having stored thereon instructions for including executable code that, when executed by one or more processors, causes the processors to receive a network request. A set of features is identified based on the network request. A faulty producer network function (NF) is identified from a plurality of producer NFs based on the set of features and a failure probability table. A subset of the plurality of producer NFs is defined that does not include the faulty one of the producer NFs. The network request is routed to one of the subset of the plurality of producer NFs.

A network traffic management system with memory comprising programmed instructions stored thereon, and one or more processors configured to be capable of executing the stored programmed instructions to receive a network request. A set of features is identified based on the network request. A faulty producer network function (NF) is identified from a plurality of producer NFs based on the set of features and a failure probability table. A subset of the plurality of producer NFs is defined that does not include the faulty one of the producer NFs. The network request is routed to one of the subset of the plurality of producer NFs.

This technology provides a number of advantages including providing methods, non-transitory computer readable media, network traffic management devices, and network traffic management systems that can provide intelligent routing of network requests to producer NFs that have a lower likelihood of failing to process the network request based on the features of the network request.

BRIEF DESCRIPTION OF THE DRAWINGS

FIG. 4 is table of exemplary network request features in accordance with embodiments of the disclosure;

FIG. 5 is an exemplary sample training data set according an example of the disclosure;

FIGS. 6A and 6B are portions of an exemplary failure probability table in accordance with an example of the disclosure;

FIG. 6C is an exemplary anti-affinity rule created based on data from the failure probability table;

DETAILED DESCRIPTION

Figure 1A:
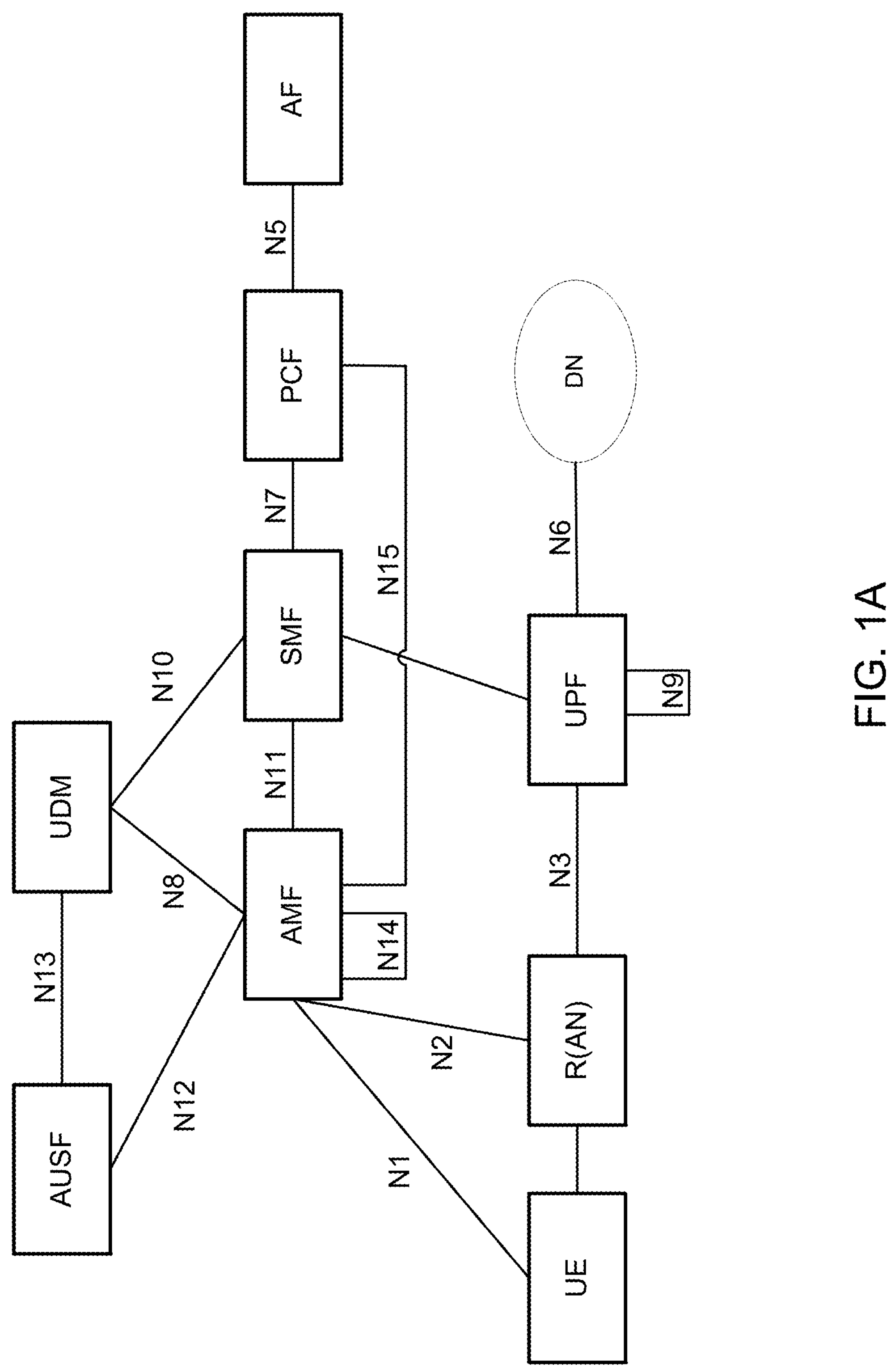
FIG. 1A is a reference point representation block diagram of an exemplary 5G system architecture.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computer elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client," "client device," "user equipment" and/or "user equipment device" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers. User equipment may be any device that is used directly by an end-user to communicate with a network and may include devices such as, for example, hand-held telephones, smartphones, laptop computers equipped with a mobile broadband adapter, or any other such device that is capable of connecting to a radio access network (RAN), Wi-Fi network, or any other such network.

A "server" (also referred to as a "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

As used herein, the term "network function" (NF) may refer to a component of a network infrastructure that provides a well-defined functional behavior (e.g., routing, switching, etc.). An NF may be a functional building block within a network infrastructure, which has well-defined external interfaces and a well-defined functional behavior. NFs may be a network node, a physical appliance or a software implementation of a previously physically implemented network functionality. As used herein, NF may refer to physical network functions (PNFs), virtualized network functions (VNFs), and/or to cloud-native network functions (CNFs).

This document generally describes systems, methods, devices and other techniques for intelligently routing network requests within a 5G core network. Conventional methods of routing network requests route traffic based on generic parameters such as load, capacity, location, data network name (DNN), network slice, International mobile subscriber identity (IMSI) ranges, etc. However, these methods are not as efficient as they could be because they do not take into account unique conditions at each NF that may be affecting the processing of messages of differing feature sets. For example, a particular NF may have received a software update that has inadvertently introduced a software bug that causes that NF to have more difficulty in processing network traffic having one or more particular features. Conventional routing methods will not account for such issues, which may lead to greater packet loss and greater inefficiency in overall data processing for the system. However, embodiments of the present disclosure provide techniques for not only identifying that a particular NF is having such an issue with network traffic of a particular type, but also for steering such network requests away from that NF so as to avoid sending a network traffic of a particular type to an NF that has a much lower likelihood of successfully processing the network traffic. Accordingly, embodiments of the present disclosure can provide intelligent routing/steering that can improve the overall efficiency and successful processing speed of a network, such as a 5G core architecture, by maximizing the message processing success rates of the services offered by NFs.

The techniques disclosed herein may involve utilizing a machine learning model, such as a naïve bayes classifier, to calculate a failure probability per feature in time series for each of a plurality of consumer NFs for incoming network requests. Thus, for example, if a particular NF is having issues successfully processing voice traffic, the system may determine that there is a significantly higher failure rate at the particular NF for processing network requests having features associated with voice traffic than other NFs, thereby allowing the system to steer future voice traffic away from the particular NF to minimize the number of failures. In another implementation, the techniques disclosed herein may involve utilizing machine learning models such as anomaly detection models/algorithms that can be used to identify an anomaly on the basis of a failure rate exceeding a configured threshold/limit. In such cases, the system can steer the network requests/traffic having the faulty features away from the destination NF instances that are identified as anomalous by virtue of having significantly higher than typical failure rates for requests having those features. As the system identifies NFs that are having higher failure rates with respect to particular network request features, the system can develop anti-affinity rules that cause incoming network requests having those features to be steered away from the correspondingly problematic NFs. According with embodiments of the present disclosure, the system may maintain a probability failure table that provides a times series of failure rates per feature per NF. The probability failure table may be dynamically updated over time such that as problems with NFs are resolved (either naturally or via human intervention) and their failure rates return to normal, corresponding anti-affinity rules may be removed and traffic having the corresponding features may again be allowed to flow to the previously problematic NFs. Thus, the disclosed techniques may provide for dynamically creating, removing or otherwise altering anti-affinity rules to divert traffic away from specified problematic NFs as processing conditions at the NFs evolve over time.

Furthermore, in addition to providing intelligent routing, embodiments of the present disclosure may also be used to identify problematic user equipment (UE) devices and/or types of UE devices and optionally take mitigating action against them. For example, if a particular model of UE device has recently received a software update, it may be the case that the software update has inadvertently introduced a software bug to the UEs that results in a higher than normal network request processing failure rate at a particular NF. For example, a software update to a particular brand of smartphone may be causing voice messages to have a higher failure rate when being processed at an SMF of a 5G core. In such cases, embodiments of the disclosed technology may be configured to identify such problems originating from one or more UEs because such errors would show up across multiple NFs (e.g., all SMFs receiving traffic from such UEs would show higher than normal failure rates). The system may be configured to provide a notification of the issue to a system administrator so that the problem can be rectified or, in some cases, the system may be configured to provide mitigating actions against the offending UEs by for example, throttling or blocking traffic from those devices. Under conventional systems, issues arising from specific devices such as a software update to a particular brand or model of device may go completely unnoticed and therefore just contribute to unnecessarily high NF failure rates and overall load on the system. However, because embodiments of the present disclosure can provide a mechanism for identifying issues originating from UEs, which can then be addressed and eventually fixed, the disclosed techniques provide advantages that allow for the reduction of NF network request processing failure rates and the reduction of the overall network request load on the system as well.

Figure 1B:
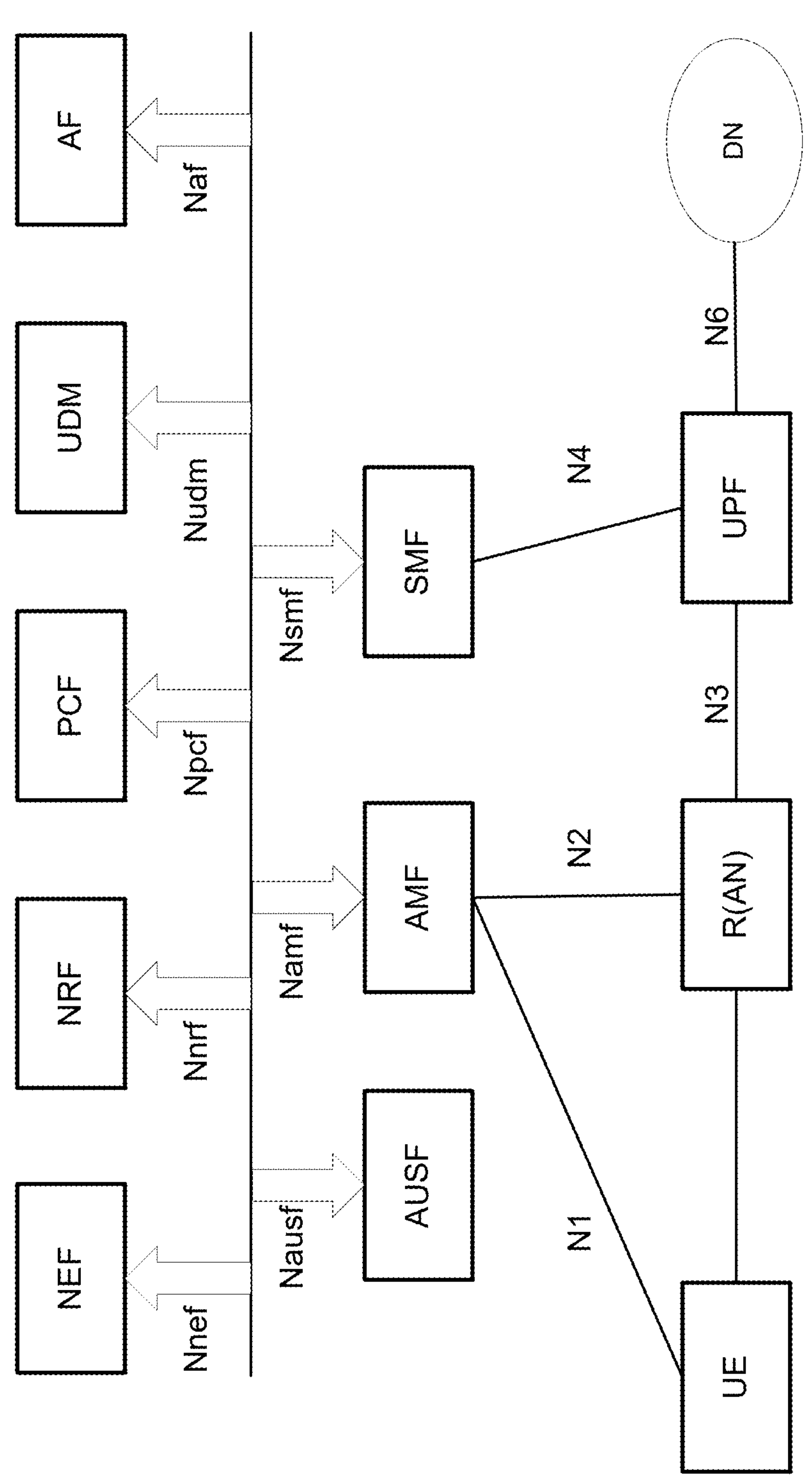
FIG. 1B is a service-based representation block diagram of an exemplary 5G system architecture.

Referring to FIGS. 1A and 1B, an exemplary reference point representation and an exemplary service-based representation of a 5G Core (5GC) network architecture is shown, as defined by the 3GPP standard. As will be understood by those of ordinary skill in the art, the reference point representation focuses on the interactions between pairs of network functions defined by point-to-point reference point (e.g., N7) between any two network functions (e.g., SMF and PCF) and is used when some interaction exists between any two network functions. Further, while the service-based representation also includes point-to-point reference points between the NFs where necessary (e.g., see lower portion of FIG. 1A), the upper portion of the figure (i.e., the 5GC Control Plane) has a "bus" and a service-based interface exhibited by individual function. This creates what is referred to as a Service Based Architecture (SBA), in which one CP network function (e.g., SMF) allows any other authorized NFs to access its services. Per the 3GPP standard, NFs within the 5GC Control Plane shall only use service-based interfaces for their instructions.

The 5G Core is made up of the following network functions: Access and Mobility Management function (AMF), Session Management function (SMF), User plane function (UPF), Policy Control Function (PCF), Authentication Server Function (AUSF), Unified Data Management (UDM), Application Function (AF), Network Exposure function (NEF), NF Repository function (NRF) and the Network Slice Selection Function (NSSF). As will be appreciated by those of ordinary skill in the art, all of these NFs are well-known and are defined by the standards organization 3GPP. Nevertheless, a brief overview of some of the functionalities of each are provided herein for reference:

The AMF may support termination of NAS signaling, NAS ciphering and integrity protection, registration management, connection management, mobility management, access authentication and authorization and security context management.

The SMF may support session management (e.g., session establishment, modification and release), UE IP address allocation and management, DHCP functions, termination of NAS signaling related to session management, DL data notification and traffic steering configuration for UPF for proper traffic routing.

The UPF may support packet routing and forwarding, packet inspection, QoS handling, acts as external PDU session point of interconnect to Data Network (DN) and is an anchor point for intra- and inter-RAT mobility.

The PCF may support unified policy framework, providing policy rules to CP functions and access subscription information for policy decisions in UDR.

The AUSF may act as an authentication server.

The UDM may support generation of Authentication and Key Agreement (AKA) credentials, user identification handling, access authorization and subscription management.

The AF may support application influence on traffic routing, accessing NEF, and interaction with policy framework for policy control.

The NEF may support exposure of capabilities and events, secure provision of information from external application to 3GPP network and translation of internal/external information.

The NRF may support service discovery function and maintains NF profile and available NF instances.

The NSSF may support selecting of the Network Slice instances to serve the UE, determining the allowed NSSAI, determining the AMF set to be used to serve the UE.

As will be understood by those of ordinary skill in the art, as further depicted in FIGS. 1A and 1B, a user equipment (UE) device (e.g., a smartphone) may access the 5G Core by connecting to a Radio Access Network (R(AN)) (e.g., a cellular network), and may ultimately access a an external Data Network (DN). The 5G architecture also may include other network devices such as routers or switches, for example, which are known in the art and thus will not be described herein.

Figure 2A:
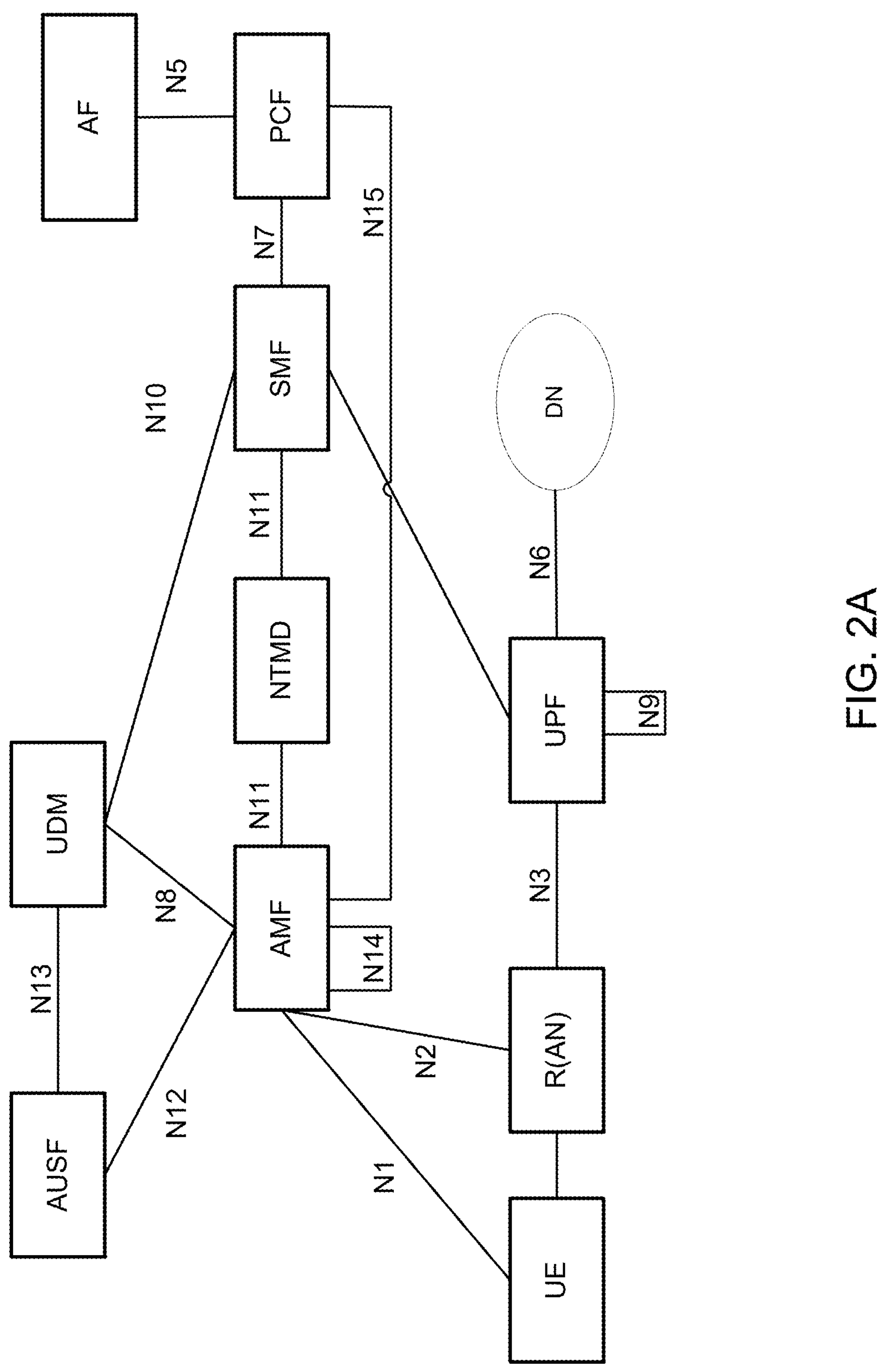
FIG. 2A is reference point representation block diagram of an exemplary 5G system architecture with a network traffic management device (NTMD) for providing intelligent signal message steering.
Figure 2B:
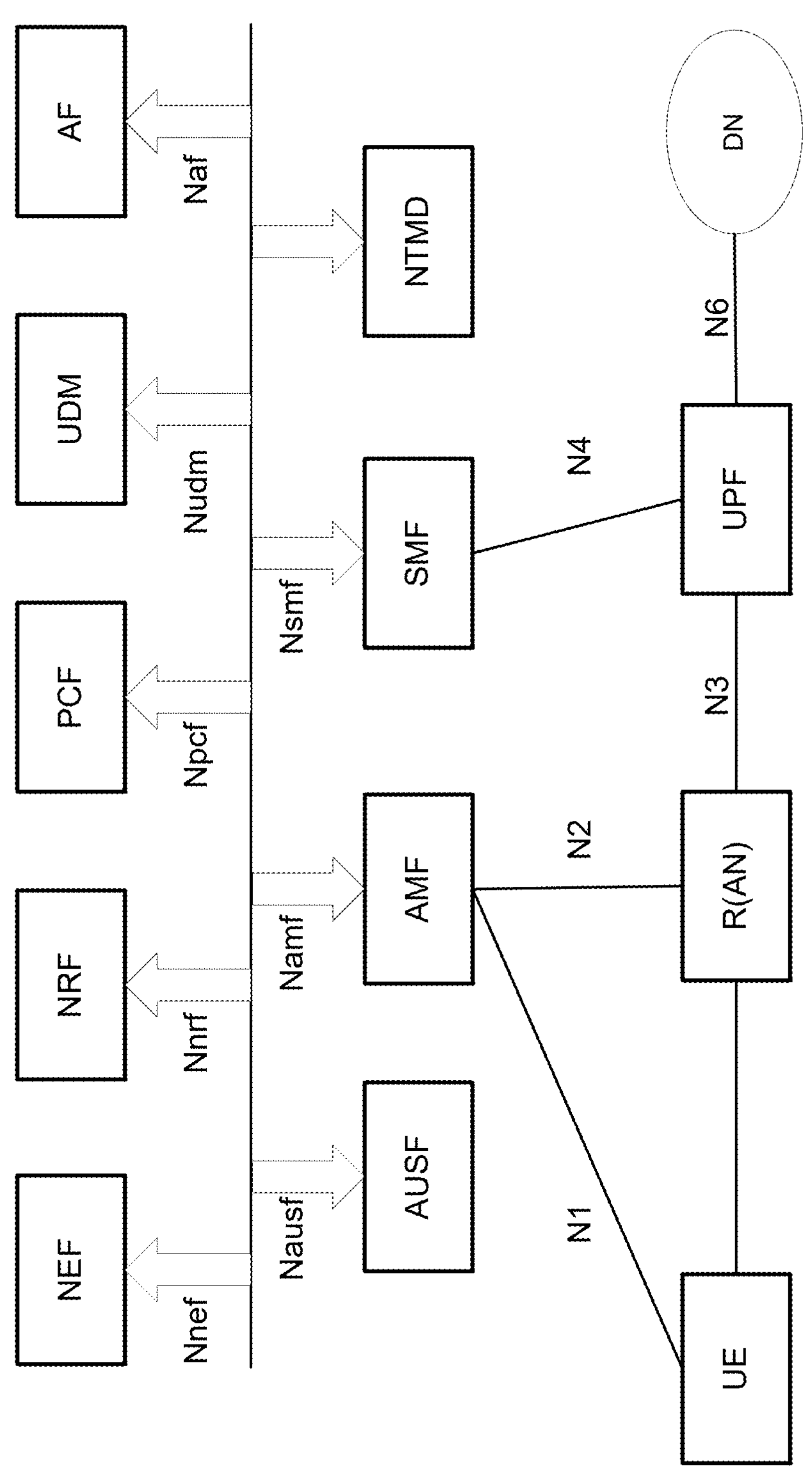
FIG. 2B is service-based representation block diagram of an exemplary 5G system architecture with an NTMD for providing intelligent signal message steering.
Figure 3:
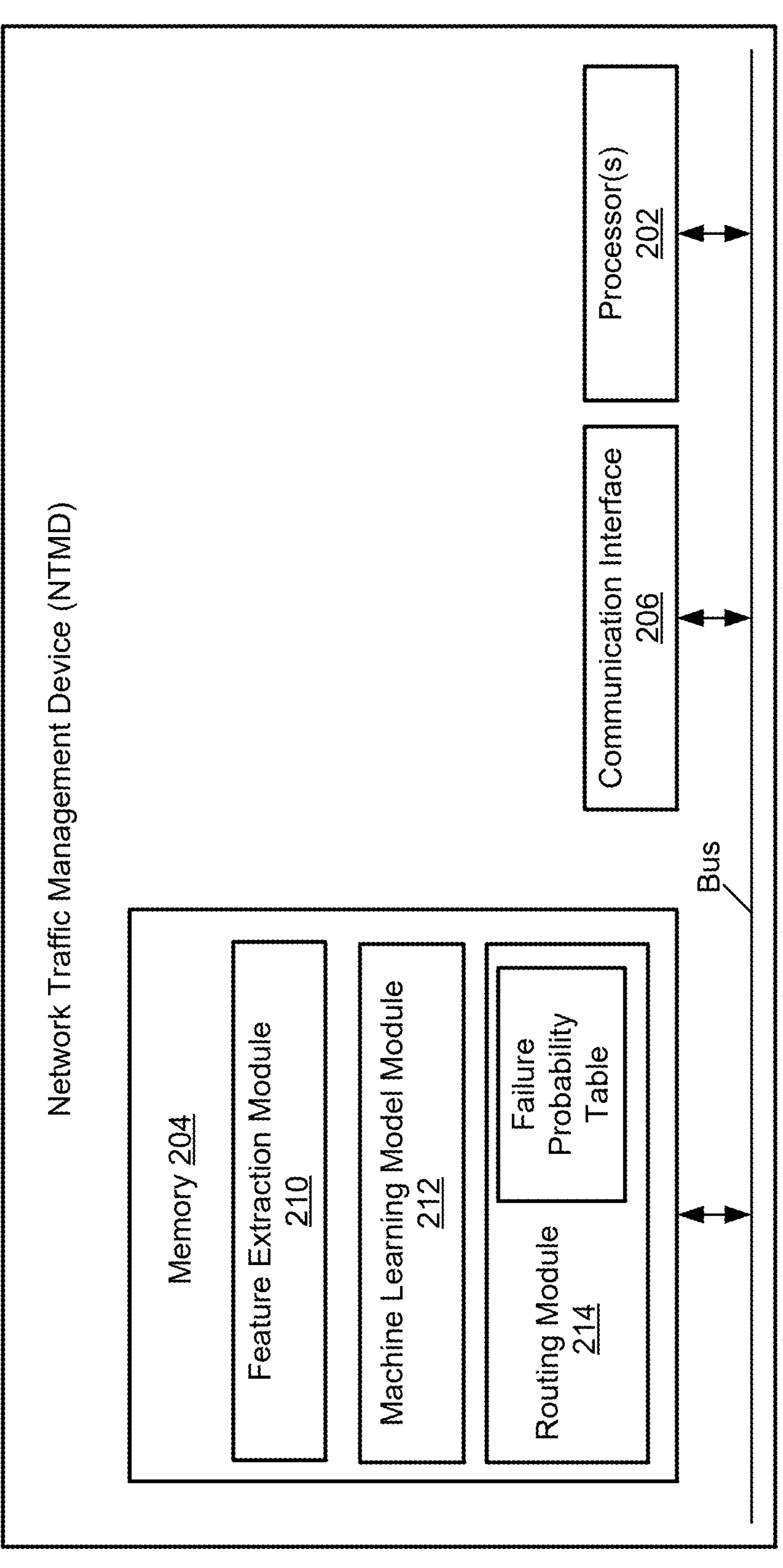
FIG. 3 is a block diagram of an exemplary network traffic management device.

Similar to FIGS. 1A and 1B, FIGS. 2A and 2B also depict a reference point representation and a service-based representation of an exemplary 5G system architecture, respectively. However, FIGS. 2A and 2B also include a network traffic management device (NTMD) in accordance with exemplary embodiments described herein. Although the NTMD is labeled as a device, it should be understood that in some embodiments the NTMD may exist as a software module on another device (e.g., a device that stores and executes multiple different software-based NFs). According to some embodiments, the NTMD may be a service communication proxy (SCP) device, as described by the 3GPP standards organization. For example, in some embodiments, the functionalities described herein may be embodied in a software update provided to an SCP that augments the functionality provided by the SCP. Further, although FIGS. 2A and 2B depict the NTMD positioned between the AMF and SMF in this example, it should be understood that in other embodiments the NTMD may be placed between any two service based interface (SBI) NFs and perform similar functionality as described herein. The NTMD may utilize different reference points or interfaces based on which NFs it is positioned between. For example, as shown in FIGS. 2A, in this example the NTMD is positioned between the AMF and SMF and so although not depicted in FIG. 2B, the NTMD would utilize the Nsmf and Namf reference points as it is a proxy between the AMF and SMF.

As mentioned above, in some embodiments the NTMD may be an SCP. Conventionally, an SCP can provide various functionalities, such as indirect communication, delegated discovery, message forwarding and routing to destination NF/NF service, message forwarding and routing to a next hop SCP, communication security (e.g., authorization of the NF Service Consumer to access the NF Service Producer API), load balancing, monitoring, overload control, and other such functionalities. An SCP can optionally interact with UDR, to resolve UDM Group ID/UDR Group ID/AUSF Group ID/PSF Group ID/CHF Group ID/HSS Group ID based on UE identity, for example SUPI or IMPI/IMPU. The SCP may be deployed in a distributed manner. More than one SCP can be present in the communication path between NF Services. SCPs can be deployed at PLMN level, shared-slice level and slice-specific level. In order to enable SCPs to route message through several SCPs (i.e., next SCP hop discovery), an SCP may register its profile in the NRF. Alternatively, local configuration may be used. Load balancing, monitoring and overload control functionality provided by the SCP is left up to implementation. Thus, examples of the present disclosure may include novel enhancements to the functionality provided by a conventional SCP.

Referring to FIGS. 2A-2B, the NTMD may perform any number of functions such as providing for intelligent routing of network requests within a 5G core network as described herein. The NTMD in this example includes processor(s) 202, a memory 204, and a communication interface 206, which are coupled together by a bus, although the NTMD can include other types or numbers of elements in other configurations. Further, although the NTMD is described herein as a device, it should be understood that in some embodiments, the NTMD may be virtualized and some or all of the functionalities of the NTMD described herein may be embodied in the form of software.

The processor(s) 202 of the NTMD may execute programmed instructions stored in the memory 204 of the NTMD for any number of functions described and illustrated herein. The processor(s) 202 of the NTMD may include one or more central processing units (CPUs) or general purpose processors with one or more processing cores, for example, although other types of processor(s) can also be used.

The memory 204 of the NTMD stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the NTMD can store one or more modules that can include computer executable instructions that, when executed by the NTMD, cause NTMD to perform actions, such as to transmit, receive, or otherwise process network messages, for example, and to perform other actions described and illustrated below with reference to FIGS. 4-8. The modules can be implemented as components of other modules. Further, the modules can be implemented as applications, software programs, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the NTMD itself, may be located in virtual server(s) running in a cloud-based computing environment rather than being tied to one or more specific physical network computing devices. Also, the modules may be running in one or more VMs executing on the security server device. Additionally, in one or more examples of this technology, virtual machine(s) running on the NTMD may be managed or supervised by a hypervisor.

In this particular example, the memory of the NTMD includes a feature extraction module 210. According to some examples, the feature extraction module 210 can extract features from a network request. According to some embodiments, the NTMD may be positioned between a consumer NF (e.g., an AMF) and a producer NF (e.g., an SMF), such that the network traffic device intercepts or otherwise receives network requests flowing from the consumer NF to the producer NF. Upon intercepting a network request originating from a consumer NF, the NTMD may extract features of the network request. Examples of extracted features may include one or more of: an IP address of a consumer NF (e.g., IP address of the AMF), a DNN, a quality of service class identifier (QCI), an allocation and retention priority (ARP), a location, and a Radio Access Technology type ("RAT-Type") (e.g., Wi-Fi, 4G, 5G). The NFMD may also be configured to receive or intercept responses (to requests) from the producer NF to the consumer NF, from which the NFMD may determine whether a given request was successfully processed or not. FIG. 4 depicts a table of exemplary network request features that may be extracted from network requests by the NTMD. It should be understood that the features described herein and shown in FIG. 4 are merely examples and that it is contemplated that any other feature not described herein that is capable of being extracted by the NTMD may be extracted according to other embodiments. Further, it is contemplated that in various embodiments, different combinations of features may be extracted from the network requests and the disclosure is not intended to be restricted to any one particular set of features.

According to some embodiments, the NTMD may encapsulate a feature footprint and insert it into the producer NF (e.g., SMF) uniform resource identifier (URI) that is sent to the consumer NF (e.g., AMF) so that for all subsequent messages (e.g., modify, handovers, etc.), features can be extracted by the NTMD. In other words, there are certain features that are forwarded from the consumer NF to the producer NF only during the session create message. Subsequently when a modify/delete message is sent, these features are not available in the message. For example, a session create request sent by a consumer NF (e.g., AMF) may include features such as Device ID and DNN in specific fields of the message payload (e.g., GTPv2 payload), however a create session response message from the producer NF (e.g., SMF) to the consumer NF (e.g., AMF) may include a URI that only includes a location of a resource and does not include features such as Device ID and DNN. However, this missing information can be preserved in a modified URI to be processed in a subsequent message. For example, a session create message (sent from consumer NF to NTMD to producer NF) may include Device ID, DNN and location features that can be extracted and stored by the NTMD as a feature set. When the response to the create session request is sent by the producer NF, the NTMD can modify the location URI in the response message's location header to embed the Device ID and the DNN. In other words, the producer NF may send a response to the create session request that has a URI that provides the location of the resource but does not include features such as Device ID and DNN, but the NTMD may modify the URI to include data representative of the Device ID and DNN such that the consumer NF receives the modified URI that encodes the Device ID and DNN. Thus, when the consumer NF (e.g., AMF) sends a subsequent message, such as a modify session request message, the consumer NF (e.g., AMF) will send the modified URI (which is embedded in the HTTP header part of the request) to the NTMD (which includes the location of the resource and data that encodes the Device ID and DNN). In other words, although the modify session request message will include the location in the message content, the Device ID and DNN features will not be available in the message content, however the Device ID and DNN features will be encoded in the URI in the header of the message. Thus, upon receiving the modify session request message, the NTMD can extract the Device ID and the DNN from the URI in the header and replace the URI with the previously received original location URI (i.e., the NTMD may modify the URI of the received modify session request message to remove the data encoding the Device ID and DNN before forwarding the modify session request message to the producer SMF). Although the previous example describes extracting and storing Device ID and DNN features, it should be understood that this is merely an example and any number or type of features described herein may be extracted/stored in this way. Thus, for every network request that is destined for a particular type of producer NF (e.g., SMFs), the NTMD may extract a set of features from the request that can be compared against features listed in anti-affinity rules associated with various producer NFs to determine whether that network request should be routed away from the respective producer NFs.

For illustrative purposes, an example of the above feature extraction process described above will now be provided. According to an example, an AMF may initiate a session by sending a create session request that includes a location and one or more additional features (e.g., DeviceID1, DNN1, etc.) in the message payload (e.g., GTPv2 payload) of the create session request. The NTMD may receive the create session request from the AMF, and may extract and store the location and one or more features from the message (as a stored "footprint") and may then forward the message to an SMF. Typically, upon receiving a create session request, the SMF creates a session (i.e., a resource) and returns the location of the resource (i.e., a URI) and the AMF will utilize the URI received from the SMF in future messages (e.g., update/delete/modify session messages) to enable the SMF to locate the session and act on it. Thus, in response to receiving the create session request, the AMF may initiate a session and transmit a create session response message that includes a location URI, such as "xyz" (where "xyz" provides the location of a requested resource). The NTMD may receive the create session response message and modify the URI to include data that encodes the stored one or more additional features, thereby creating the modified URI, such as "xyzABC" (where "xyz" provides the location of the request resource and "ABC" encodes the one or more additional features. The NTMD may forward the create session response message with the modified URI to the AMF such that the AMF receives the URI "xyzABC." Upon sending a subsequent request message, such as a modify session request message, the AMF will utilize the modified URI. Thus, for example, the AMF may send a modify session request message to the NTMD that includes the URI "xyzABC." The modify session request message may include an HTTP header and a GTPv2 payload. While the GTPv2 payload of the create session request includes fields for the one or more additional features (e.g., DeviceID1, DNN1, etc.), the GTPv2 payload of subsequent messages (e.g., modify/delete/update session messages) does not include such fields and therefore will not indicate the one or more additional features. Thus, conventionally, modify/update/delete session messages could not be used to extract such additional features as such features would not be included in messages originating from the AMF subsequent to the create session request message. However, according to examples of the present disclosure, the modified URI may be included in the HTTP header of such subsequent messages originating from the AMF (e.g., the header of the modify session request message). Accordingly, upon receiving the modify session request message, the NTMD may extract the data that encodes the one or more additional features (i.e., "ABC") and identify the one or more additional features (e.g., DeviceID1, DNN1, etc.) based on the previously stored footprint. The NTMD may remove the data encoding the one or more additional features from the URI and then forward the modify session request message to the SMF such that the URI in the header of the message received by the SMF only includes the location (i.e., "xyz"). In this way, the NTMD may extract and identify a set of features from network requests.

The memory 204 of the NTMD can also include a machine learning model module 212. The machine learning model module 212 in this example can be trained to predict a response outcome (e.g., success or failure) of a particular network request by a particular producer NF based on the features that are extracted from the network request. According to some embodiments, the machine learning model may be a naïve bayes machine learning algorithm, which may use Bayes' theorem to classify objects based on their features and can assign probabilities to each possible outcome or class for a given problem instance. In other embodiments, any other type of suitable machine learning model may be utilized, such as, for example, anomaly detection algorithms that can be used to measure deviations of failure rates from a configured/automatically detected threshold.

According to some embodiments, the machine learning model may use features extracted from incoming network requests and the responses to the requests responses as a training set. According to some embodiments, when an anomaly is detected (e.g., a failure rate exceeding a threshold) model learning may be stopped and mitigation enforcement may begin and when the problem is rectified and normalcy is restored, learning/training mode may be restarted. FIG. 5 illustrates an exemplary sample training data set that may be used to train a machine learning model. As shown in this example, the sample training set includes the features of the AMF IP, DNN, QCI, ARP Location, RAT-type and whether the response to the request was a success or failure. Based on the training data, the machine learning model can, for each feature on a per consumer NF basis (e.g., per each SMF), determine a failure probability and/or rate for the feature at the particular consumer NF. According to some embodiments, the model can be retrained at regular intervals (e.g., every hour). In some embodiments, the model training may occur continuously but anomaly detection using the learned data may be periodic. The trained model can generate a time series table of failure probabilities and/or rates as shown by the example tables depicted in FIGS. 6A and 6B. According to some embodiments, a machine learning model may be a naïve bayes algorithm that calculates the probability of failure based on the data set. In some embodiments, the machine learning model may include an anomaly detection algorithm, in which case the values may represent an actual failure rate/percentage over the specified time period. In other words, in one implementation the failure probability may represent a prediction of failure based on the machine learning, and in another case (that utilizes anomaly detection) the failure probability may represent actual failure rates observed over the time period. For each feature (e.g., IP version) and possible value thereof (e.g., ipv4, ipv6, etc.), the NTMD may generate a failure probability table (or any other suitable data structure, such as a database, etc.) that lists the failure rates for network requests that include that feature value per consumer NF per time interval (all of which collectively may be referred to as a single "failure probability table"). In the example shown in FIGS. 6A and 6B, the failure probability tables indicate that SMF1 is having abnormally high failure rates (relative to both its own baseline and to the other SMFs) with respect to network requests having a DNN feature of "internet" and a session type of "ipv6" starting at 12:00 PM on 30 Nov. 2022. According to some embodiments, when the failure rate of a particular producer NF to process a network request having a particular feature exceeds a predetermined threshold, the NTMD may generate an anti-affinity rule for the particular producer NF that includes the particular feature. FIG. 6C shows an example of an anti-affinity rule generated based on the example data of the failure probability tables shown in FIGS. 6A and 6B. As shown, the anti-affinity rule specifies that for network requests having a DNN feature of "internet" and a Session type of "ipv6", the network request should not be sent to SMF1.

According to some embodiments, the NTMD may form an anti-affinity rule when one or more failure probabilities exceed a predetermined threshold above a baseline amount for the feature. For example, for the feature session type=ipv6, a baseline failure rate may be a range of between 0% and 2% per hour and a predetermined threshold may be 0.5%. Thus, as shown in FIG. 6B, all of the failure rates in the columns corresponding to 10:00 am and 11:00 am are within the normal baseline range. At the 12:00 pm hour, the failure rate for SMF1 exceeds the predetermined threshold (i.e., 0.5%) above the baseline amount (i.e., maximum of the baseline range which is 2%). In other words, the 4.5% failure rate exceeds the 2.5% baseline plus threshold amount for which an anti-affinity rule should be formed. Although the 2.3% failure rate of SMF3 is above the baseline amount, it is still within the predetermined threshold and so will not yet be used to create an anti-affinity rule. According to some embodiments, where there failure rates that exceed a baseline level plus a predetermined threshold for a plurality of different features associated with the same producer NF, then the NTMD may create an anti-affinity rule that includes all of some of these features. For example, as shown in FIGS. 6A and 6B, for the features DNN=internet and session type=ipv6, SMF1 has may have failure rates that exceed baseline levels for each by a respective predetermined threshold amount, which may result in the NTMD creating an anti-affinity rule as shown in FIG. 6C, which indicates that if a new incoming network request has features of DNN=internet and Session type=ipv6 then the network request will be routed away from SMF1.

According to some embodiments, NTMD may generate separate rules for each feature such that if a network request has any of the features associated with high failure rates then an anti-affinity rule will apply to it. In some embodiments, the particular features that are included in an anti-affinity rule may be determined by the NTMD based on the NTMD determining which features are causing the failures. For example, if there are 10 features that are associated with high failure rates for a particular producer NF, the NTMD may determine that only 5 of the 10 appear to corresponds to the cause of the failures and thus may exclude the other 5 features from the anti-affinity rule(s). According to some embodiments, the NTMD may determine which features are correspond to the cause of the failures by trial and error or by using, for example, an anomaly detection algorithm using histograms. In other words, the NTMD may form a first rule that includes a first subset of features (of the set being associated with abnormally high failure rates) and observe whether application of this rule causes the failure rate to be reduced over a predetermined time period or predetermined number of network requests and if not, the NTMD may try a different rule with a different second subset of features and observe whether application of this rule reduces the failure rate of the network requests at the producer NF, and so on until NTMD isolates the features that are linked to the cause of the failures. In some embodiments, when there appears to be a combination of features that is causing the failure, the NTMD may determine which features to use in an anti-affinity rule by examining whether the deviation of failure rate for the features individually would be in similar proportion to the overall failures when the features are combined. For example, if failure rate for messages having features F1, F2 and F3 has increased by 2% and increase in individual failure rates of all messages having F1 is around 1.8%, F2 around 2.1% and F3 is around 2.05% then the NTMD may determine that all 3 features are together contributing to the failure. However, if increase in failure rate for a combination of F2 and F3 is only around 0.1%, the algorithm may conclude that F2 and F3 are causing significant failure only when they are appearing along with F1 in a message and not otherwise. According to some embodiments, upon determining that the failure rates of one or more features that have been included in an anti-affinity rule have returned to more normal levels, the NTMD may remove, delete or modify the anti-affinity rule to remove such one or more features.

The memory 204 of the NTMD can also include a routing module 214, which may determine how network requests from a consumer NF should be routed to a particular producer NF. According to some embodiments, the routing module may include or have access to the failure probability table(s) and anti-affinity rules generated as described above. Upon receiving a new network request from a producer NF, NTMD may extract the features of the network request as described above, then the routing module 214 may compare the extracted features to any anti-affinity rules that have been created based on the failure probability table and if one or more anti-affinity rules apply to the network request based on the extracted features and the corresponding features found in the anti-affinity rules, then the routing module 214 may cause prevent the network request from being routed to NFs corresponding to the applicable anti-affinity rules. For example, based on the anti-affinity rule shown in FIG. 6C, if a network request is received that has feature values that correspond to DNN=internet and Session type=ipv6, then the routing module 214 will cause the network request to be prevented from being routed to SMF1 and it will instead be routed to one of SMF2 or SMF3. According to some embodiments, after applying the anti-affinity rule, the routing module 214 may route the network request to one of the remaining NFs based on one or more of the load, the capacity and the location of each of the remaining NFs.

Although FIGS. 2A-2B only depict a single NTMD and singular NFs (e.g., AMF, SMF, etc.), it should be understood that it is contemplated that the system architecture may include many of each. For example, there may be many NTMDs that communicate with various producer NFs and consumer NFs. In some embodiments, in addition to a NTMD communicating with various producer NFs, a given producer NF may communicate with a plurality of NTMDs. Thus, a producer NF may have network messages routed to it from multiple NTMDs who are communicating with multiple consumer NFs. According to some embodiments, each NTMD may operate independently of the others and may maintain its own failure probability table(s) relating to the failure probabilities of the consumer NFs that it is connected to.

The communication interface 206 of the NTMD operatively couples and communicates between the NTMD and various other NFs, such as for example, AMF, SMF, UDM, AF, PCF, NRF, AUSF and NEF and further allows communication to UE, R(AN), UPF and DN as shown in, for example, FIG. 2B. According to some embodiments, some or all of the NFs may be executed as software on a single device that may be configured to allow communication between NFs. According to some embodiments, the communication interface 206 may be coupled to a communication network(s) that allow for communication with NFs that may be located on a separate device than the NTMD as well as other external devices such as UE, R(AN) and DN devices. According to some embodiments, the NTMD may be a separate physical device. However, in some embodiments, the enhancements disclosed herein may alternatively be embodied in a software component that may be uploaded to a device such as an SCP. In some embodiments, a similar software module may work in tandem with other devices similar to a SCP that may act as a load balancer proxy.

By way of example only, the communication network(s) can include local area network(s) (LAN(s)) or wide area network(s) (WAN(s)), and can use TCP/IP over Ethernet and industry-standard protocols, although other types or numbers of protocols or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the NTMD is illustrated in this example as including a single device, the NTMD in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the NTMD.

Additionally, one or more of the devices that together comprise the NTMD in other examples can be standalone devices or integrated with one or more other devices or apparatuses, such as one or more server devices, for example. Moreover, one or more of the devices of the NTMD in these examples can be in a same or a different communication network including one or more public, private, or cloud networks, for example.

Although the NTMD is illustrated as single device, one or more actions of each of the NTMD may be distributed across one or more distinct network computing devices that together comprise one or more of the NTMDs. Moreover, the NTMD is not limited to a particular configuration. Thus, the NTMD may contain network computing devices that operate using a master/slave approach, whereby one of the network computing devices of the NTMD operate to manage or otherwise coordinate operations of the other network computing devices. The NTMD may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, in some embodiments, the machine learning module and/or anomaly detection module may be an integrated software component of an a device such as an NTMD or SCP. In some embodiments, the machine learning module and/or anomaly detection module may be run as a separate container in a cloud-based deployment and may interact with the NTMD or SCP and any other proxy that provide inputs about the features to the module and receives feedback/actions from the module. In some embodiments, the machine learning module and/or anomaly detection module may be implemented as a separate artificial intelligence or machine learning device that is positioned in front of the NTMD/SCP/other proxy in the network. In this case, there may be a non-standard communication between this device and the NTMD/SCP/other proxy to feed the features, response status, etc. to this device as input and receive anti-affinity rules/failure tables as outputs from this device. In some embodiments, the machine learning module that detects the faulty features and/or faulty NFs may be part of a non-standard NF load balancer/proxy.

The user equipment (UE) devices of the 5G network architecture in this example include any type of computing device that can exchange network data, such as mobile, desktop, laptop, or tablet computing devices, virtual machines (including cloud-based computers), or the like. Each of the UE devices includes a processor, a memory, and a communication interface, which are coupled together by a bus or other communication link (not illustrated), although other numbers or types of components could also be used.

The UE devices may run interface applications, such as standard web browsers or standalone client applications. The interface applications may provide an interface to make requests for, and receive content stored on, one or more of server devices that are part of the data network (DN). The UE devices may further include a display device, such as a display screen or touchscreen, or an input device, such as a keyboard for example (not illustrated).

Although the exemplary 5G system architecture with NTMD, UE device, R(AN), DN and various NFs are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the 5G system architecture, such as the NTMD and various NFs, for example, may be configured to operate as virtual instances on the same physical machine. In other words, one or more of the NTMD and various NFs may operate on the same physical device rather than as separate devices communicating through communication network(s). Additionally, there may be more or fewer NTMDs or instances of various NFs than illustrated in FIGS. 2A-2B.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory of the NTMD, for one or more aspects of the present technology, as described and illustrated by way of the examples herein. The instructions in some examples include executable code that, when executed by one or more processors, such as the processor(s) of the NTMD may cause the processors to carry out steps necessary to implement the methods of the examples of this technology that are described and illustrated herein.

Figure 7:
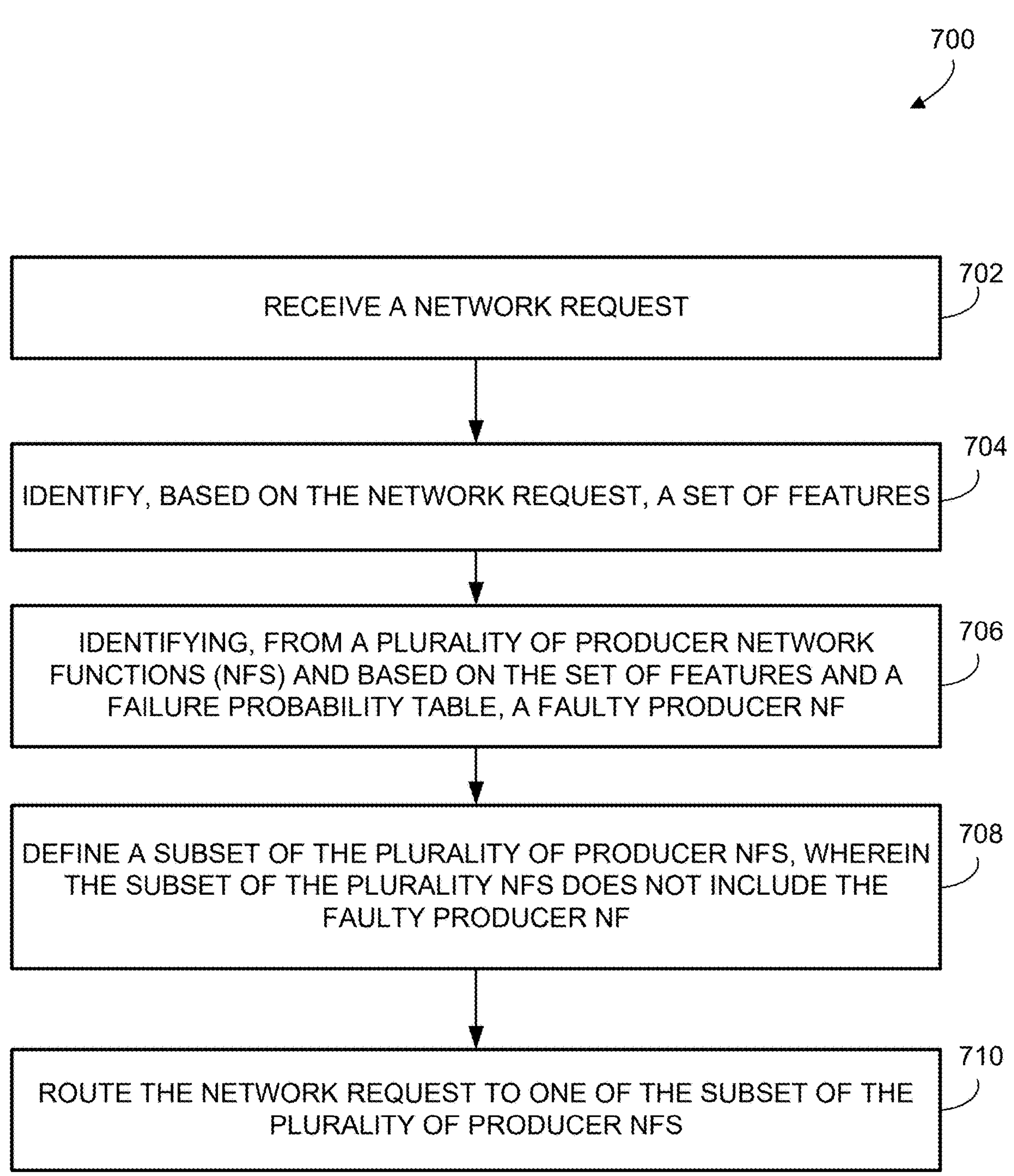
FIG. 7 is a flow diagram of an exemplary method for intelligently routing network requests within a 5G core network.

An exemplary method of intelligently routing network requests within a 5G core network will be described with reference to FIGS. 2A-7. Referring more specifically to FIG. 7, a flow diagram of an example method 700 of intelligently routing network requests within a 5G core network is illustrated. In step 702 in this example, the NTMD may receive a network request. According to some embodiments, the NTMD may be a service communication proxy (SCP) device that has been modified to perform the functions described herein. In some embodiments, the NTMD may be positioned between a consumer NF and a producer NF, such as for example, between an AMF and an SMF. In this example, the NTMD would intercept/receive network requests from the AMF (the consumer NF) that are intended for an SMF (the producer NF). The NTMD may also be configured to receive/intercept responses from the producer NF to the consumer NF, from which it may determine whether a request was successfully processed or not. According to some embodiments, the producer NF and consumer NF may be configured to direct the requests and responses directly to the NTMD, as for example, the NTMD's IP address may be configured locally at the consumer/producer NFs or the consumer/producer NFs may discover the NTMD from the NRF using provisions specified in 3GPP specification 29.510.

In step 704, the NTMD may identify a set of features based on the network request. For example, as described above with respect to FIGS. 3 and 4, the NTMD may include a feature extraction module that can extract various features (and their corresponding values) from the network request. Thus, for each network request that is received by the NTMD, the NTMD will extract a corresponding set of feature values.

In step 706, the NTMD may identify a faulty producer network function (NF) from a plurality of NFs based on the set of features and a failure probability table. It will be appreciated more than one producer NF may experience faults in response to a particular feature set and it is contemplated that the techniques described herein may be used to identify all such faulty producer NFs in the same manner as described with respect to the single faulty producer NF described herein. According to some embodiments, the failure probability table is configured to track, for each of the plurality of producer NFs, a time series of network request processing failure rates for each of a plurality of features. For example, as described previously above with respect to FIGS. 3, 6A and 6B, the NTMD may include a machine learning model module. Accordingly, in some embodiments, the network request processing failure rates may be determined using a machine learning model, such as a naïve bayes algorithm, by for example, receiving features of the requests and whether the requests were successfully processed or not as inputs, and outputting a probability that each feature was the cause of the failures. In other words, in some embodiments, the machine learning model is trained to predict a probability of request processing failures using features extracted from a plurality of previous requests where each of the plurality of previous requests is known to have either been successfully processed or known to have had a processing failure.

According to some embodiments, NTMD may identify a faulty one of the producer NFs by determining that the producer NF has failure rates associated with one or more feature values that exceed a predetermined threshold percentage above a baseline percentage. In some embodiments, the baseline percentage may be a maximum percentage of a range of percentages that are considered normal failure levels (e.g., during a specified time of day and/or day of the week) for the network requests having the associated type of feature.

Alternatively, according to some embodiments, the NTMD may identify a faulty one of the producer NFs by determining that a producer NF has the highest failure rate for a given feature value out of a set of all available producer NFs. Thus, in such a case, the NTMD may be configured to steer network requests that include the given feature value away from an NF that has the highest failure rate associated with that feature value.

In step 708, the NTMD may define a subset of the plurality of producer NFs such that the subset of the plurality of producer NFs does not include the faulty one of the producer NFs. In other words, the NTMD may define an anti-affinity rule that excludes the faulty producer NF from being one of the options that the network request may be routed to.

In step 710, the NTMD may route the network request to one of the subset of the plurality of producer NFs. According to some embodiments, routing the network request to one of the subset of the plurality of producer NFs is based on one or more of a load of each of the subset of the plurality of producer NFs, a capacity of each of the subset of the plurality of producer NFs, and a location of each of the subset of the plurality of producer NFs. In other words, after excluding the faulty producer NF as a possible destination for the received network request, the NTMD may then route the received network request among a remaining set of producer NFs using more conventional approaches.

Figure 8:
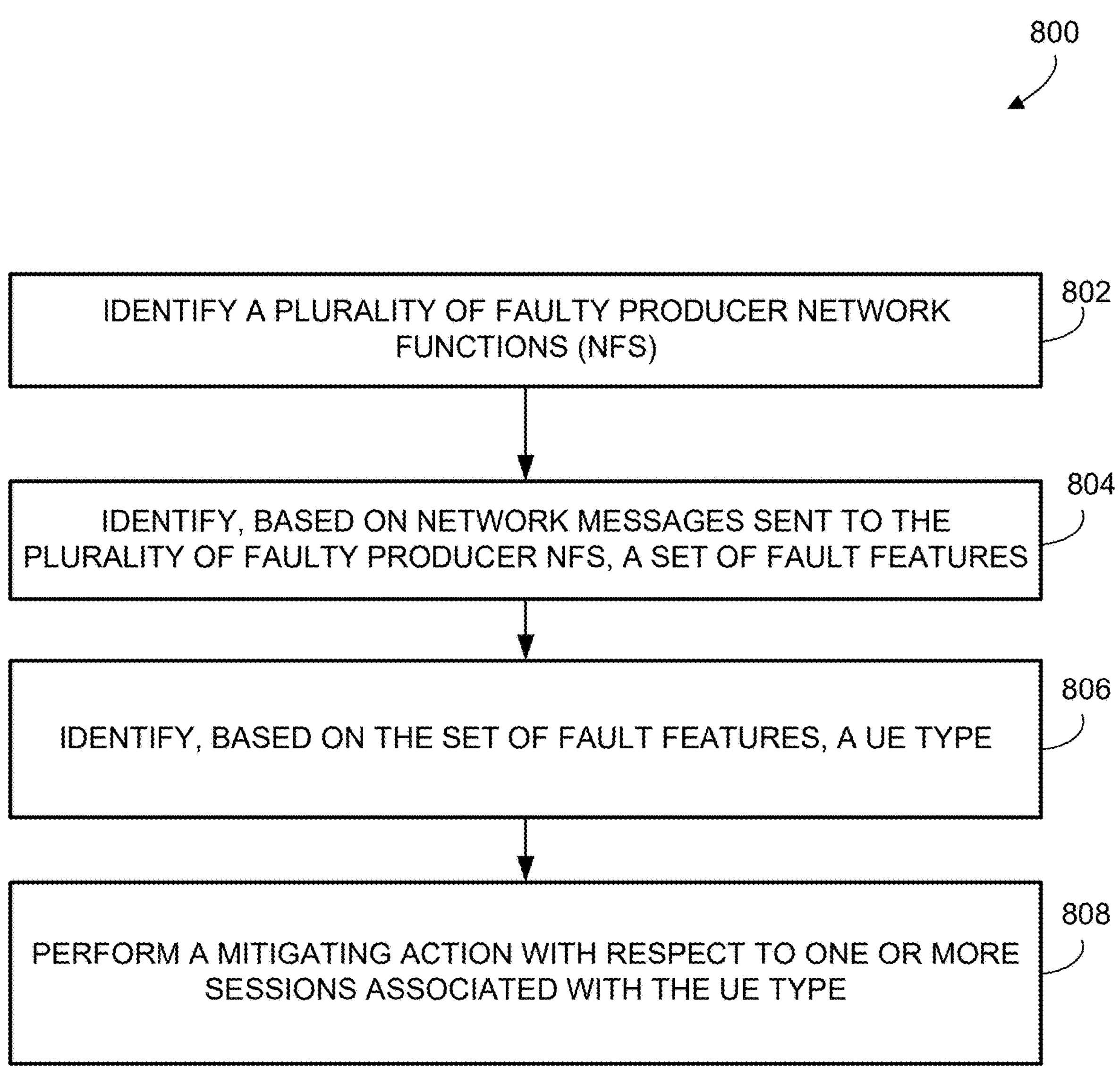
FIG. 8 is a flow diagram of an exemplary method for identifying faulty user equipment (UE) interacting with a 5G core network.

Referring to FIG. 8, an exemplary method 800 of identifying faulty UE devices interacting with a 5G core network is illustrated and will now be described. In step 802 in this example, the NTMD may identify a plurality of faulty producer NFs. For example, the NTMD may maintain a failure probability table that provides failure rates of the processing of network messages per feature value per producer NF in time series. In other words, for every producer NF to which the NTMD is connected, the NTMD may maintain a table indicating failure rates at various time intervals for each feature value of a plurality of features that may be extracted from network requests. The NTMD may identify a plurality of faulty producer NFs by identifying two or more producer NFs to which the NTMD is connected (i.e., may direct traffic to) that have failure rates that are higher than a predetermined threshold amount above a baseline failure rate. Each type of feature may have its own baseline failure rate and predetermined threshold.

In step 804, the NTMD may identify a set of fault features based on network messages sent to the plurality of faulty producer NFs. A fault feature may be a feature that is causing a higher than normal failure rate at a producer NF. The NTMD may identify a set of fault features that are common among the plurality of faulty producer NFs. For example, if NF1 has fault features 1, 2, 3 and 4, NF2 has fault features 2, 3 and 5, and NF3 has fault features 2, 3 and 4, the NTMD may determine that the set of fault features is 2 and 3, as these are common features that appear to be causing failures across all three NFs having failures. This set of fault features may be considered to be a fault footprint.

In step 806, the NTMD may identify a UE type based on the set of fault features. In other words, according to some embodiments, the NTMD may identify a UE type based on the fault footprint. Referring to the example in the previous paragraph for instance, the NTMD may determine that features 2 and 3 correspond to a particular make of smartphone that is running a particular version of an operating system. Thus, the NTMD may determine that there is a UE-related problem relating to this particular type of smartphone running this particular operating system. According to some embodiments, the NTMD may utilize such fault fingerprints to identify various aspects of a UE, such as manufacturer, model, operating system version, browser, location and other such features. For example, as will be appreciated by those of ordinary skill in the art, an International Mobile Station Equipment Identity Software Version (IMEISV) is a feature that identifies a device and is made up of a 16 digit value in which the first 8 digits identify the manufacturer, the next 6 digits identify the serial number unique to the particular device within the manufacturer and the last 2 digits represent the software version of the device. Thus, if the IMEISV is one of the faulty features identified by the NTMD, the digits of the IMEISV can be analyzed to identify the manufacturer, serial number and software version of the devices causing the failures. Another example may include features of Public Land Mobile Network (PLMN) code and location, which are two features that may not directly indicate the device but may be used to identify a particular RAN cell site by identifying that the device is used with a SIM card of a specific telecom operator and is connected to a particular location. It will be understood that these are merely examples and it is contemplated to other features may similarly be used to identify issues with specific devices (e.g., particular cell towers) or devices (e.g., particular make/models and/or software versions).

In step 808, the NTMD may perform a mitigating action with respect to one or more sessions associated with the UE type. For example, the NTMD may throttle or block network traffic from devices or sessions associated with or originating from devices of the UE type. Further, in some embodiments, performing a mitigating action may include generating a notification to a system administrator that details one or more of the NFs that are experiencing faults, the feature values/fault footprint associated with the faults and the UE type that the NTMD has identified as being the source of the faulty NFs. In this way, the system can detect problems that are being caused by UE and notify administrators so that the problem with UE can be rectified (e.g., by updating UE software to fix a bug).

With this technology, for intelligent routing network requests within a 5G core network can be achieved such that faulty NFs can be identified and traffic that would have a significant likelihood of failing to be successfully processed by a faulty NF can be diverted away from the faulty NF while still providing a load balancing functionality. Thus, the system can advantageously perform load balancing while simultaneously reducing the rate of message processing failures that occur across NFs. The system can dynamically route/steer traffic away from faulty NFs in accordance with the changing conditions of the network, such that as new NFs begin to fail and previously faulty NFs return to normal operation the system can automatically create and remove anti-affinity rules that best minimize failure rates in accordance with evolving NF conditions. Furthermore, the system allows for the identification of problems resulting in high NF processing failure rates that are not problems with the NFs themselves, but rather are problems that originate from UEs. Upon identifying that a set of UEs appear to have a problem that is causing heightened NF processing failure rates, the system can generate a notification that identifies the set of UEs that are causing a problem so that an administrator can address the issue. Further, in some embodiments, upon identifying a set of UEs that are causing NF processing failures, the system may optionally take one or more mitigating actions against such UEs by throttling or blocking network traffic originating from those UEs. Thus, the system can advantageously identify issues arising from both NFs and UEs, and take actions to minimize NF processing failure rates to increase the reliability and speed of service provided by the 5G network.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifi- cations are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a network traffic management system comprising one or more network traffic management devices and network functions (NFs), the method comprising:

receiving a network request;

identifying, based on the network request, a set of features;

identifying, from a plurality of producer NFs and based on the set of features and a failure probability table, a faulty one of the producer NFs by determining that a failure probability rate associated with at least one feature in the set of features exceeds a predetermined threshold;

defining a subset of the plurality of producer NFs, wherein the subset of the plurality of producer NFs excludes the faulty one of the producer NFs; and routing the network request to one of the subset of the plurality of producer NFs.

2. The method of claim 1, wherein the failure probability table is configured to track, for each of the plurality of producer NFs, a time series of network request processing failure rates for each of a plurality of features.

3. The method of claim 2, wherein the network request processing failure rates are determined using a machine learning model.

4. The method of claim 3, wherein the machine learning model is trained to predict a probability of request processing failures using features extracted from a plurality of previous requests, wherein each of the plurality of previous requests is known to have either been successfully processed or known to have had a processing failure.

5. The method of claim 1, wherein routing the network request to one of the subset of the plurality of producer NFs is based on one or more of:

a load of each of the subset of the plurality of producer NFs;

a capacity of each of the subset of the plurality of producer NFs; or a location of each of the subset of the plurality of producer NFs.

6. A network traffic management device, comprising memory comprising programmed instructions stored thereon and one or more processors configured to be capable of executing the stored programmed instructions to:

receive a network request;

identify, based on the network request, a set of features;

identify, from a plurality of producer network functions (NFs) and based on the set of features and a failure probability table, a faulty one of the producer NFs by determining that a failure probability rate associated with at least one feature in the set of features exceeds a predetermined threshold;

define a subset of the plurality of producer NFs, wherein the subset of the plurality of producer NFs excludes the faulty one of the producer NFs; and route the network request to one of the subset of the plurality of producer NFs.

7. The device of claim 6, wherein the failure probability table is configured to track, for each of the plurality of producer NFs, a time series of network request processing failure rates for each of a plurality of features.

8. The device of claim 7, wherein the network request processing failure rates are determined using a machine learning model.

9. The device of claim 8, wherein the machine learning model is trained to predict a probability of request processing failures using features extracted from a plurality of previous requests, wherein each of the plurality of previous requests is known to have either been successfully processed or known to have had a processing failure.

10. The device of claim 6, wherein routing the network request to one of the subset of the plurality of producer NFs is based on one or more of:

a load of each of the subset of the plurality of producer NFs;

a capacity of each of the subset of the plurality of producer NFs; or a location of each of the subset of the plurality of producer NFs.

11. A non-transitory computer readable medium having stored thereon instructions comprising executable code that, when executed by one or more processors, causes the processors to:

receive a network request;

identify, based on the network request, a set of features;

identify, from a plurality of producer network functions (NFs) and based on the set of features and a failure probability table, a faulty one of the producer NFs by determining that a failure probability rate associated with at least one feature in the set of features exceeds a predetermined threshold;

define a subset of the plurality of producer NFs, wherein the subset of the plurality of producer NFs excludes the faulty one of the producer NFs; and route the network request to one of the subset of the plurality of producer NFs.

12. The non-transitory computer readable medium of claim 11, wherein the failure probability table is configured to track, for each of the plurality of producer NFs, a time series of network request processing failure rates for each of a plurality of features.

13. The non-transitory computer readable medium of claim 12, wherein the network request processing failure rates are determined using a machine learning model.

14. The non-transitory computer readable medium of claim 13, wherein the machine learning model is trained to predict a probability of request processing failures using features extracted from a plurality of previous requests, wherein each of the plurality of previous requests is known to have either been successfully processed or known to have had a processing failure.

15. The non-transitory computer readable medium of claim 11, wherein routing the network request to one of the subset of the plurality of producer NFs is based on one or more of:

a load of each of the subset of the plurality of producer NFs;

a capacity of each of the subset of the plurality of producer NFs; or a location of each of the subset of the plurality of producer NFs.

16. A network traffic management system, comprising one or more network traffic management devices and network functions (NFs) with memory comprising programmed instructions stored thereon and one or more processors configured to be capable of executing the stored programmed instructions to:

receive a network request;

identify, based on the network request, a set of features;

identify, from a plurality of producer NFs and based on the set of features and a failure probability table, a faulty one of the producer NFs by determining that a failure probability rate associated with at least one feature in the set of features exceeds a predetermined threshold;

define a subset of the plurality of producer NFs, wherein the subset of the plurality of producer NFs excludes the faulty one of the producer NFs; and route the network request to one of the subset of the plurality of producer NFs.

17. The system of claim 16, wherein the failure probability table is configured to track, for each of the plurality of producer NFs, a time series of network request processing failure rates for each of a plurality of features.

18. The system of claim 17, wherein the network request processing failure rates are determined using a machine learning model.

19. The system of claim 18, wherein the machine learning model is trained to predict a probability of request processing failures using features extracted from a plurality of previous requests, wherein each of the plurality of previous requests is known to have either been successfully processed or known to have had a processing failure.

20. The system of claim 16, wherein routing the network request to one of the subset of the plurality of producer NFs is based on one or more of:

a load of each of the subset of the plurality of producer NFS;

a capacity of each of the subset of the plurality of producer NFs; or a location of each of the subset of the plurality of producer NFs.

* * * * *